United States Patent [19]

Emilsson et al.

[11] Patent Number: 4,745,849

[45] Date of Patent: May 24, 1988

[54] SPRING BRAKE ACTUATOR FOR A RAIL VEHICLE BRAKE UNIT

[75] Inventors: Fred S. Emilsson, Villa Solhem; Krister E. Ljung, Leifs väg, both of Sweden

[73] Assignee: SAB Nife AB, Landskrona, Sweden

[21] Appl. No.: 933,899

[22] Filed: Nov. 24, 1986

[30] Foreign Application Priority Data

Dec. 12, 1985 [SE] Sweden ................. 8505704

[51] Int. Cl.⁴ ............... F01B 7/00; F01B 31/00
[52] U.S. Cl. ................................. 92/63; 92/65; 92/108; 92/130 A
[58] Field of Search .............. 92/63, 64, 65, 108, 92/113, 130 R, 130 A

[56] References Cited

U.S. PATENT DOCUMENTS

| | | | |
|---|---|---|---|
| 2,809,723 | 10/1957 | Howze | 188/106 |
| 3,065,997 | 11/1962 | Frankhouser et al. | 92/63 |
| 3,372,623 | 3/1968 | Wearden et al. | 92/130 A X |
| 3,563,139 | 2/1971 | Page et al. | 92/130 A X |
| 3,576,152 | 4/1971 | Chevreux | 92/65 |
| 3,842,716 | 10/1974 | Swander, Jr. | 92/113 X |
| 4,280,398 | 7/1981 | Kerscher et al. | 92/130 A X |
| 4,478,319 | 10/1984 | Casalone et al. | 92/130 A X |
| 4,601,457 | 7/1986 | Austin et al. | 92/63 X |

FOREIGN PATENT DOCUMENTS

| | | |
|---|---|---|
| 2806229 | 3/1979 | Fed. Rep. of Germany . |
| 2044854 | 10/1980 | Fed. Rep. of Germany . |
| 2168397 | 8/1973 | France . |
| 2364367 | 4/1978 | France . |
| 2473143 | 7/1981 | France . |
| 1024330 | 6/1983 | U.S.S.R. . |

Primary Examiner—Edward K. Look
Assistant Examiner—Mark A. Williamson
Attorney, Agent, or Firm—Laurence R. Brown; Alfred J. Mangels

[57] ABSTRACT

A spring brake actuator for a rail vehicle brake unit, comprising a cylinder and a rod shaped member. The actuator includes a cylinder-shaped housing, a piston with a piston rod and a spring intended to act in a brake applying direction.

In order to obtain a truly modular system the actuator, as an integrated and self-contained unit, is arranged on the rod-shaped member of the brake unit. Its housing is attached to the brake unit cylinder. The actuator piston rod is tubular and slidable on the rod-shaped member.

10 Claims, 2 Drawing Sheets

4,745,849

SPRING BRAKE ACTUATOR FOR A RAIL VEHICLE BRAKE UNIT

TECHNICAL FIELD

This invention relates to a spring brake actuator for a rail vehicle brake unit, in the form of a cylinder and a rod-shaped member, the actuator includes a cylinder-shaped housing, a piston with a piston rod, and a spring arranged between the housing and the piston rod and intended to act in a brake applying direction.

BACKGROUND ART

Spring brake actuators of this type are well known in the art. Normally they are attached to the cylinder and form an elongation of the unit. In such a case the spring brake actuator piston rod acts on the brake unit piston for applying the force of the spring at parking or emergency braking, when the spring is not compressed under the action of a brake fluid pressure on the opposite side of the actuator piston.

In some instances it has been found more advantageous to arrange the spring brake actuator around the rod-shaped member of the brake unit, whereby the disadvantage with the added length is obviated, but still these designs are bulky and suffer from drawbacks.

It is desirable to see the brake unit as the basis for a modular system, whereby different functions of the system may be obtained.

The object of this invention is basically to combine the advantages of a spring brake actuator arranged around the rod-shaped member of the brake unit and the advantages of the truly modular system.

SUMMARY OF THE INVENTION

This is attained according to the invention attained in that the spring brake actuator as an integrated and self-contained unit is arranged on the rod-shaped member of the brake unit with its housing attached to the brake unit cylinder, the piston rod of the actuator being tubular and slidable on said rod-shaped member and being arranged to act on an outgoing force-transmitting part of the brake unit.

An especially advantageous design is obtained in that the actuator housing is attached to a brake cylinder bottom, integral with said rod shaped member, preferably by a common clamp band, which serves to attach both a brake unit cylinder housing and the actuator housing to the brake unit cylinder bottom.

A brake unit is normally provided with brackets for its mounting to a suitable part of the vehicle underframe. In an arrangement consisting of a brake unit with spring brake actuator the actuator housing may be provided with such mounting brackets.

The tubular piston rod of the actuator is preferably arranged to act on a locking ring in a circumferential groove in the outgoing force-transmitting part of the brake unit.

BRIEF DESCRIPTION OF THE DRAWINGS

The invention will be described in further detail below, reference being made to the accompanying drawings, in which.

DETAILED DESCRIPTION OF A PREFERRED EMBODIMENT

Figure 1:
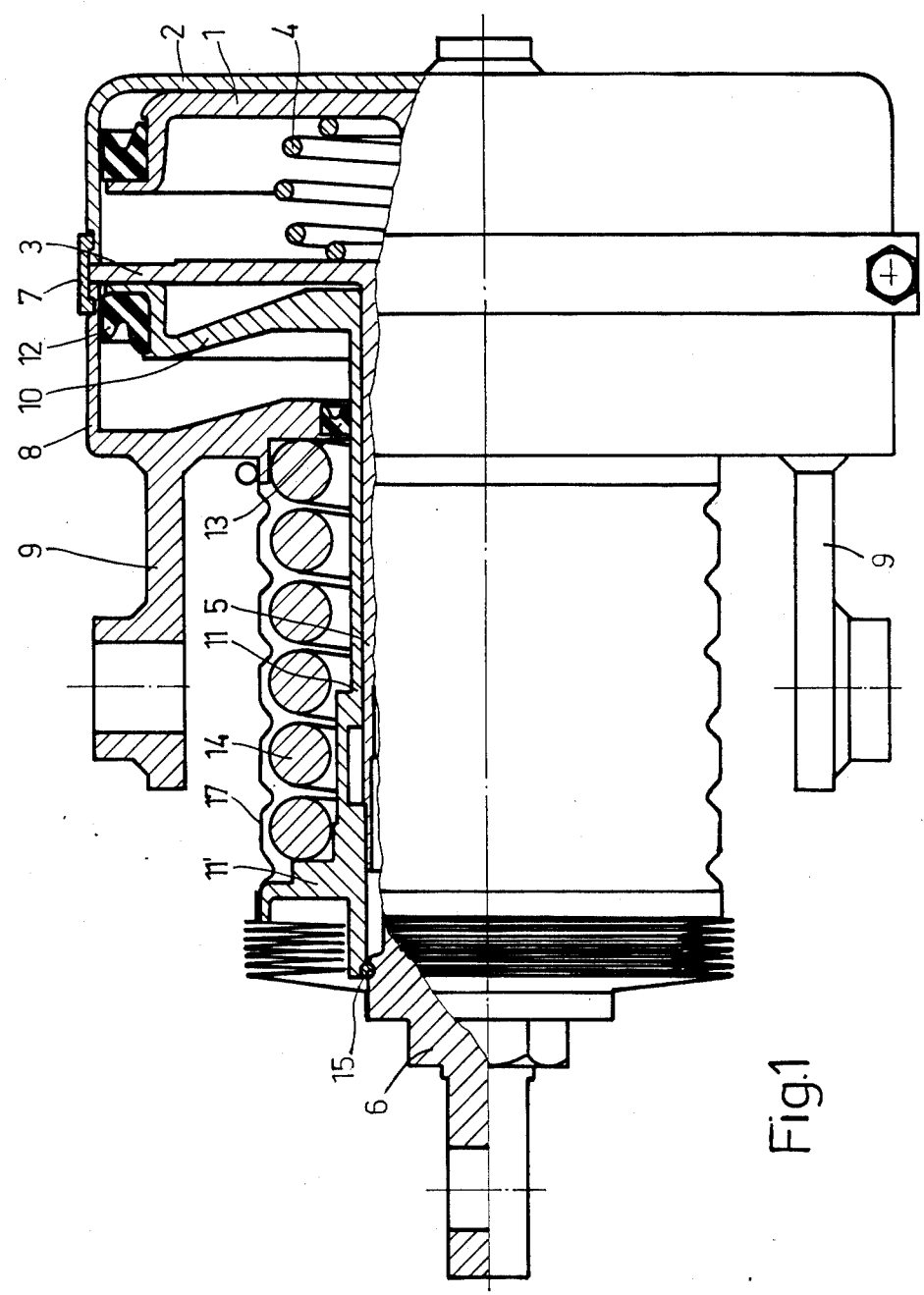
FIG. 1 is a side view, partly in section, of a brake unit with a spring brack actuator according to the invention.

A combined rail vehicle brake unit and spring brake actuator is shown in FIG. 1.

A brake unit piston 1 is axially movable in a brake unit cylinder comprising a housing 2 and a bottom 3. A return spring 4 is as usual arranged between the piston 1 and the bottom 3. A rod shaped member 5 is integral with the bottom 3 and houses a slack adjuster (not shown) of any conventional kind. An outgoing, force-transmitting part 6 may for the simple purpose of understanding the present invention be regarded as connected to the piston 1. A clamp band 7, further described below, serves to attach the housing 2 to the bottom 3.

Figure 2A:
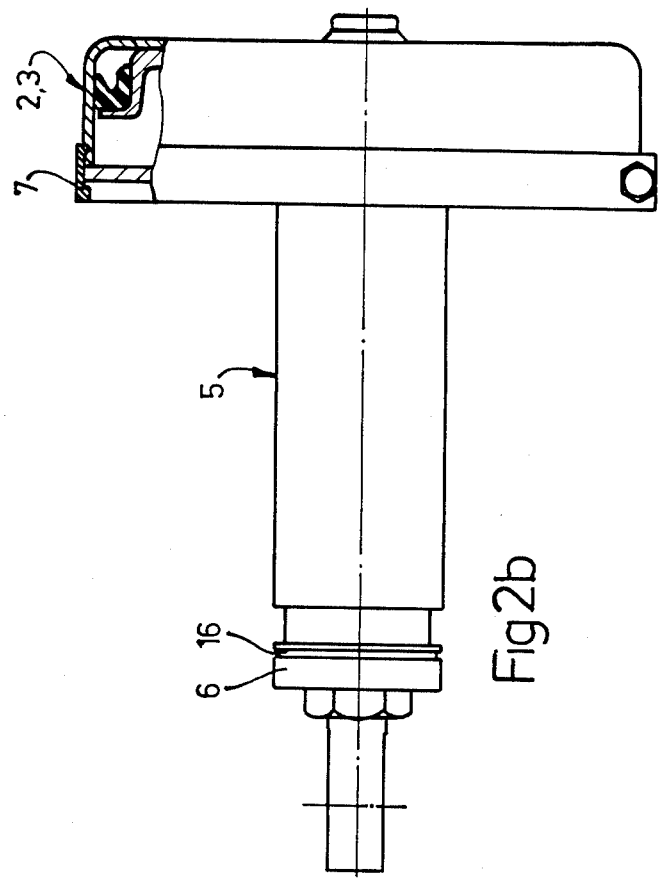
FIGS. 2a and 2b are corresponding side views to a smaller scale of a spring brake actuator and a brake unit, respectively, ready for assembly into the arrangement according to FIG. 1.
Figure 2B:
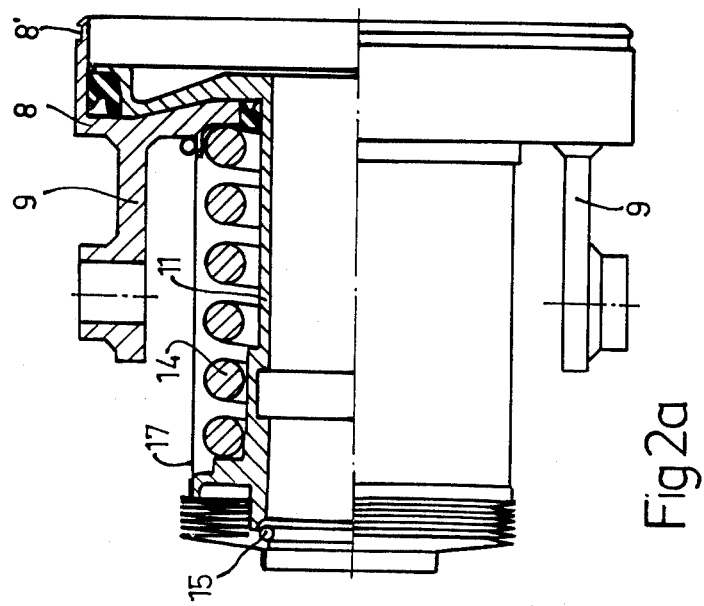

The basic brake unit so far described is also shown in FIG. 2b.

A spring brake actuator to be combined with the brake unit is shown by itself in FIG. 2a and together with the brake unit in FIG. 1; reference is mainly made to FIG. 1. The actuator has a cylinder-shaped housing 8 provided with brackets 9 for the mounting of the combined brake unit and actuator to a suitable part of a rail vehicle underframe (not shown). A piston 10 with a piston rod 11 is axially movable in the cylinder-shaped housing 8. The piston 10 is provided with a sealing ring 12, and a further sealing 13 is arranged in the housing 8 against the piston rod 11. A forceful compression spring 14 of the helical type is arranged between the housing 8 and the flange 11' on the piston rod 11.

The piston rod 11 is tubular and slidable on the rod-shaped member 5 of the brake unit. It is arranged to act on the outgoing, force-transmitting part 6 of the brake unit with its free end (to the left in FIG. 1) via an abutment ring 15 arranged in a circumferential groove 16 (FIG. 2b) in part 6.

A bellows 17 for preventing the intrusion of moisture and dirt is attached at its left hand end, as viewed in FIG. 1, to part 6 and at its right hand end to the actuator housing 8. There is also an attachment to the piston rod flange 11'.

In FIG. 1 both the brake unit and the spring brake actuator are shown in their respective inactive conditions. For the spring brake actuator this means that the spring 14 is held compressed by brake fluid pressure acting on the piston 10. It is obvious that if this fluid pressure is lowered, the force of the spring 14 will act on the outgoing force-transmitting part 6 via the ring 15. In FIG. 2a the spring brake actuator is shown in its condition with the spring 14 expanded.

The arrangement shown in FIG. 1 consists of a brake unit as shown in FIG. 2b and a spring brake actuator as shown in FIG. 2a. For assembly, the tubular piston rod 11 of the actuator is slidably carried on the rod-shaped member 5 and housing 8 is attached to housing 2 by the clamp band 7 cooperating with a corresponding groove 8' in the actuator housing 8. The abutment ring 15 is attached and the bellows 17 fastened to the part 6.

Modifications are possible within the scope of the appended claims.

We claim:

1. Brake Apparatus for a rail vehicle, comprising: service brake means including first actuating means for operating a service brake, the service brake means including a cylinder and a tubular member carried by the cylinder, and on outwardly extending force-transmitting part; second actuating means for operating the service brake means, the second actuating means including a cylinder-shaped housing, piston means slidably carried in the cylinder-shaped housing and including piston rod means, spring means positioned between the housing and the piston rod means for biasing the piston rod means in a brake applying direction, the second actuating means being an integrated and self-contained unit surrounding the tubular member of the service brake means, and the piston rod means of the second actuating means being tubular and slidably carried on said tubular member to act on the outwardly extending force-transmitting part of the brake unit in response to the bias of the spring means.

2. Brake apparatus according to claim 1, wherein the cylinder-shaped housing is connected with the cylinder of the service brake means.

3. Brake apparatus according to claim 2, wherein a clamp band means connects the cylinder of the service brake means and the housing of the second actuating means.

4. Brake apparatus according to claim 3, wherein said clamp band means is U-shaped in cross-section and engages with outwardly extending ridges on each of the cylinder of the service brake means and the housing of the second actuating means.

5. Brake apparatus according to claim 1, wherein the housing of the second actuating means includes mounting means for mounting the brake apparatus on the rail vehicle.

6. Brake apparatus according to claim 1, including an abutment ring carried in a cylindrical groove in the force-transmitting part, wherein the piston rod means of the second actuating means acts on the abutment ring.

7. A spring brake actuator combination for a rail vehicle brake unit, comprising a cylinder and piston for developing a movement and force in response to a selectably applied fluid substance under pressure in a direction releasing the brakes, a tubular piston rod movable with said piston to transmit the piston movement and force to the rail vehicle brake unit, a braking spring located between the housing and the piston rod to bias the piston rod for movement in a brake applying direction with a force to be overcome by a force exerted on the piston by the fluid under pressure, a rod tubular member concentric with the piston rod and positioned within the piston rod for the piston rod to slide thereupon, a force transmitting member connected with the vehicle brake unit to transmit a braking force to a brake unit in response to the force of the braking spring, coupling means for coupling the tubular piston rod to the force-transmitting member upon release of fluid pressure on the piston and for permitting independent movement of the rod-shaped member in a brake applying direction when fluid pressure is exerted on the piston and the braking spring is compressed, a second piston rod extending from the force transmitting means and positioned interiorly of the tubular member, the second piston rod operatively connected with a second piston movable within a second cylinder for selectively operating the brake unit between brake applying and brake releasing positions.

8. The combination defined in claim 7 further comprising a fluid operable service brake cylinder and piston coupled to move the force transmitting member in a brake applying direction in response to a selectively applied fluid under pressure acting on said brake cylinder and piston.

9. The combination defined in claim 8 further comprising a generally cylindrically shaped housing enclosing the spring brake piston and coupled to the service brake cylinder to mount the spring brake unit concentrically about the force-transmitting member and coaxially with the cylindrically shaped housing.

10. The combination defined in claim 9 further comprising a U-shaped clamping band coupling the cylindrically shaped housing with the service brake cylinder.

* * * * *